United States Patent [19]

Taniguchi

[11] Patent Number: 4,827,396
[45] Date of Patent: May 2, 1989

[54] SEQUENTIAL CONTROLLER

[75] Inventor: Yasunori Taniguchi, Nagasaki, Japan

[73] Assignee: Mitsubishi Denki Kabushiki Kaisha, Tokyo, Japan

[21] Appl. No.: 85,023

[22] Filed: Aug. 13, 1987

[30] Foreign Application Priority Data

Aug. 14, 1986 [JP] Japan .................... 61-189676

[51] Int. Cl.⁴ .................... G06F 3/00; G05B 11/01
[52] U.S. Cl. .................... 364/140; 364/143; 364/136; 364/183; 364/185; 371/24; 371/60
[58] Field of Search .................... 364/140, 141–144, 364/136, 183, 185, 200 MS File, 900 MS File; 371/24, 29, 60, 71

[56] References Cited

U.S. PATENT DOCUMENTS

| | | | |
|---|---|---|---|
| 4,129,901 | 12/1978 | Masuda | 364/141 |
| 4,165,534 | 8/1979 | Dummermuth et al. | 364/141 |
| 4,314,329 | 2/1982 | Crew et al. | 364/900 |
| 4,339,794 | 7/1982 | Hideshima et al. | 364/141 |
| 4,502,112 | 2/1985 | Fujiwara et al. | 364/200 |
| 4,616,306 | 10/1986 | Kuzma et al. | 364/143 |

FOREIGN PATENT DOCUMENTS 57-52907  3/1982  Japan .

Primary Examiner—Jerry Smith
Assistant Examiner—Paul Gordon
Attorney, Agent, or Firm—Bernard, Rothwell & Brown

[57] ABSTRACT

Disclosed is a sequential controller in which the step of control sequence for controlling various process control devices is advanced by a step advance unit basing on the time count by an answer-back timer. The controller includes an input check unit in which input collating check units provided for individual inputs to the control devices implement individual checking at each control step so as to detect abnormality of the control devices or abnormality of input to the related internal sections. Each input collating check unit compares the alloted input signal with the input expected value at the current control step retrieved from an input table in accordance with the input signal, and, in case both values are not consistent over the entire range at that step, it issues an alarm output if the input expected value at the current control step is consistent with the input expected value at the preceding control step, or it issues an alarm signal upon expiration of the answer-back timer if both input expected values are not consistent. The controller skips the answer-back checking when input expected values of each input at two consecutive control steps are equal, thereby preventing the malfunctioning in the input checking operation.

10 Claims, 10 Drawing Sheets

| STEP | 1 | 2 | 3 | 4 | 5 | 6 | 7 | 8 |
|---|---|---|---|---|---|---|---|---|
| OUTPUT TABLE — 1ST OUTPUT | 1 | 0 | 1 | 0 | 1 | 1 | 0 | 1 |
| 2ND OUTPUT | 0 | 1 | 0 | 0 | 1 | 0 | 0 | 1 |
| ⋮ | ⋮ | ⋮ | ⋮ | ⋮ | ⋮ | ⋮ | ⋮ | ⋮ |
| n-TH OUTPUT | 0 | 0 | 1 | 0 | 1 | 1 | 1 | 0 |
| INPUT TABLE — 1ST INPUT | 1 | 0 | 1 | 0 | 1 | 1 | 0 | 1 |
| 2ND INPUT | 0 | 1 | 0 | 0 | 1 | 0 | 0 | 1 |
| ⋮ | ⋮ | ⋮ | ⋮ | ⋮ | ⋮ | ⋮ | ⋮ | ⋮ |
| n-TH INPUT | 0 | 0 | 1 | 0 | 1 | 1 | 1 | 0 |

SEQUENTIAL CONTROLLER

BACKGROUND OF THE INVENTION

1. Field of the Invention

The present invention relates to a sequential controller applied to the field of ordinary life or various industrial fields including mechanical and process plants for implementing the sequential control for various actuating devices, and more particularly to a sequential controller with the ability of an answer-back checking which operates in consideration of operation time of each controlled device when input expected values at two consecutive control steps are different.

2. Description of the Prior Art

In the field of ordinary life and in various industrial fields, there are widely used sequential controllers which control the operation of actuating devices, such as motors, solenoids, electromagnetic valves and cylinders, through preprogrammed logical operations for the detected values of controlled variables such as positions, levels, pressures and temperatures.

An example of conventional sequential controllers is shown in block diagram in FIG. 1. The sequence controller consists of a central processing unit (will be termed simply "CPU" hereinafter) 1 which controls each section of the controller and has a memory for storing the control sequence, an input unit 2 which receives signals from sensing devices in the form of relay contacts and limit switches, an input table 3 which stores the expected input signal pattern, an answer-back timer 4 which counts an answer-back time, an input check unit 5 which compares the input signals with the signal pattern in the input table 3 in accordance with the outputs of the CPU 1, input unit 2, input table 3 and answer-back timer 4, a step advance unit 6 which issues the current step number to the input table 3 and output table 7 (will be explained next) in response to the step advance signal provided by the input check unit 5, an output table 7 which is accessed by the CPU 1 and step advance unit 6 to release a prerecorded output pattern, an output unit 8 which produces output signals for controlling the operation of the actuating devices in accordance with the outputs of the output table 7 and CPU 1, and an alarm output unit 9 which produces an alarm signal based on the outputs of the CPU 1 and input check unit 5.

The operation of the foregoing system arrangement will be described. This sequential controller operates in compliance with a certain control procedure for the intended sequence control programmed in a step table (not shown). FIG. 2 is a detailed logic circuit diagram of the input check unit 5 in the sequential controller, and FIG. 3 is a flowchart showing control procedure of the input unit 5. The following describes the operation of the conventional sequential controller with reference to FIGS. 2 and 3.

Initially in step ST1, the output pattern of signals to be produced for 1st output 1 through n-th output is read out of the output table 7 via the output unit 8 to the 1st output through n-th output. For example, the 1st through n-th outputs are given 1, 0, 0, ..., 0 in step ST1. Then, the answer-back timer 4 starts counting time in step ST2, and subsequently signals from 1st input through n-th input are entered to the input check unit 5 via the input unit 2 in step ST3 as shown in FIG. 3. In step ST4, the expected values of these input signals received through the 1st through n-th inputs are compared with the input signal pattern which is set in the input table 3. Namely, for the above example, step 1 of sequence control tests whether or not input values of the 1st through n-th inputs as shown by the above step pattern are equal to 1, 0, 0, ..., 0. If all input signals are consistent with the input pattern at the currently executed step in the input table 3 (will be termed "current step input expected values" hereinafter) as tested in step ST5, the control step is advanced in step ST6. If, on the other hand, step ST5 has detected inconsistency between any input signal and the corresponding input expected value, expiration of the answer-back timer 4 is tested in steps ST7 and ST8. Unless the timer 4 has expired, the operations following the input signal reading, i.e., steps ST3, ST4 and ST5 are repeated. If the steps ST7 and ST8 have detected the expiration of the answer-back timer 4, the input check unit 5 issues an alarm signal to the outside via the alarm output unit 9 in step ST9 so as to inform the abnormality of the control operation or the external device.

In case input expected values are different between two consecutive control steps, it is necessary to allow a certain suspension time before the end of the operation determined by the answer-back timer 4 in consideration that the pertinent controlled device is slow in operation and needs more time to respond to the activation signal. An example of this case is shown in the portion of 2nd input indicated by symbol Pa in FIG. 4, which is a timing chart showing the transition of the input 2 in the control step table. In another case where the current step input expected values are equal in two consecutive control steps, it is not necessary to provide an actuation signal for the controlled device for changing the state of the controlled device between the two control steps. In this case, however, execution of the sole answer-back checking mentioned above cannot detect the abnormal operation of the device, i.e., erroneous transition of the signal to "1" which ought to be "0", as shown in the portion of 2nd input indicated by symbol Pb in FIG. 4.

The conventional sequence controller arranged as described above has a problem in which the answer-back checking takes place irrespective of whether current step input expected values of one input are equal or unequal between two consecutive control steps.

An example of the foregoing prior art sequential controller is described in Japanese Patent Publication Laid-open No. 57-52907.

SUMMARY OF THE INVENTION

It is an object of the present invention to provide a sequential controller which implements the answer-back checking in a prescribed manner when current step input expected values are different between two contiguous control steps, or implements the collation for the input state after advancement of the step with the expected input value when the current step input expected value is equal in two contiguous control steps, thereby ensuring the detection of a false operations of a controlled device and abnormality of an external device in the sequential control system.

In order to achieve the above objective, the inventive sequential controller is provided with an input check unit which compares the current step input expected value with the previous step input expected value for each input, so that if the comparison has revealed the consistence of both expected values, a check circuit in the input check unit tests as to whether each input is always equal to the current step input expected value, or for an input signal with its input expected value being different between the previous step and current step, the usual answer-back checking is carried out.

BRIEF DESCRIPTION OF THE DRAWINGS

FIG. 6A shows the first through n-th input check circuits as a whole, and FIG. 6B shows any input check circuit $10_i$;

FIG. 7A shows the operation of checking any input $I_i$ using any input check circuit $10_i$ of FIG. 6B, and FIG. 7B shows the operation of the input check unit 10 as a whole in the specific control step;

DETAILED DESCRIPTION OF THE PREFERRED EMBODIMENT

Figure 1:
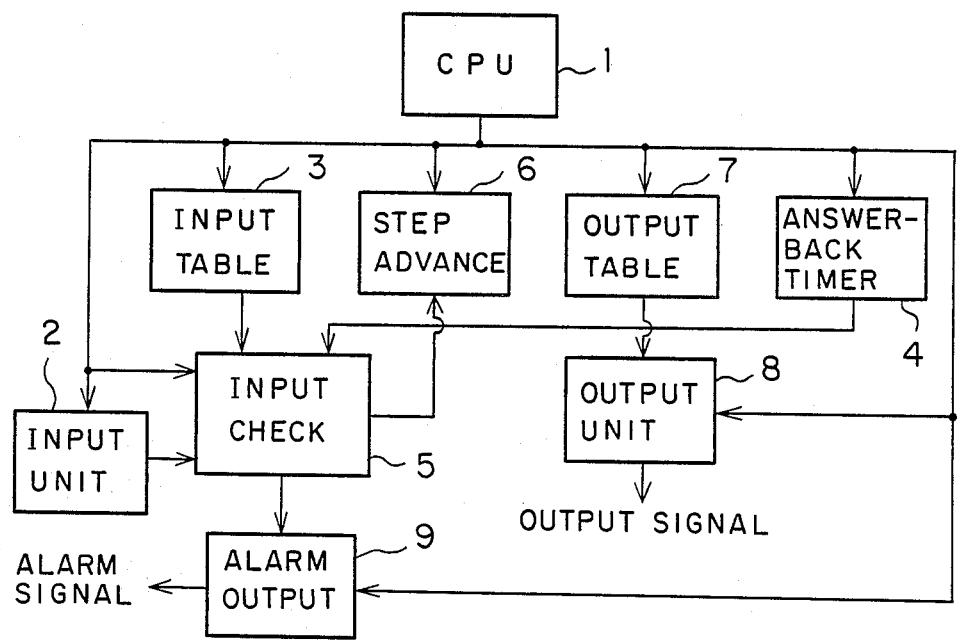
FIG. 1 is a block diagram showing an example of conventional sequential controllers.
Figure 2:
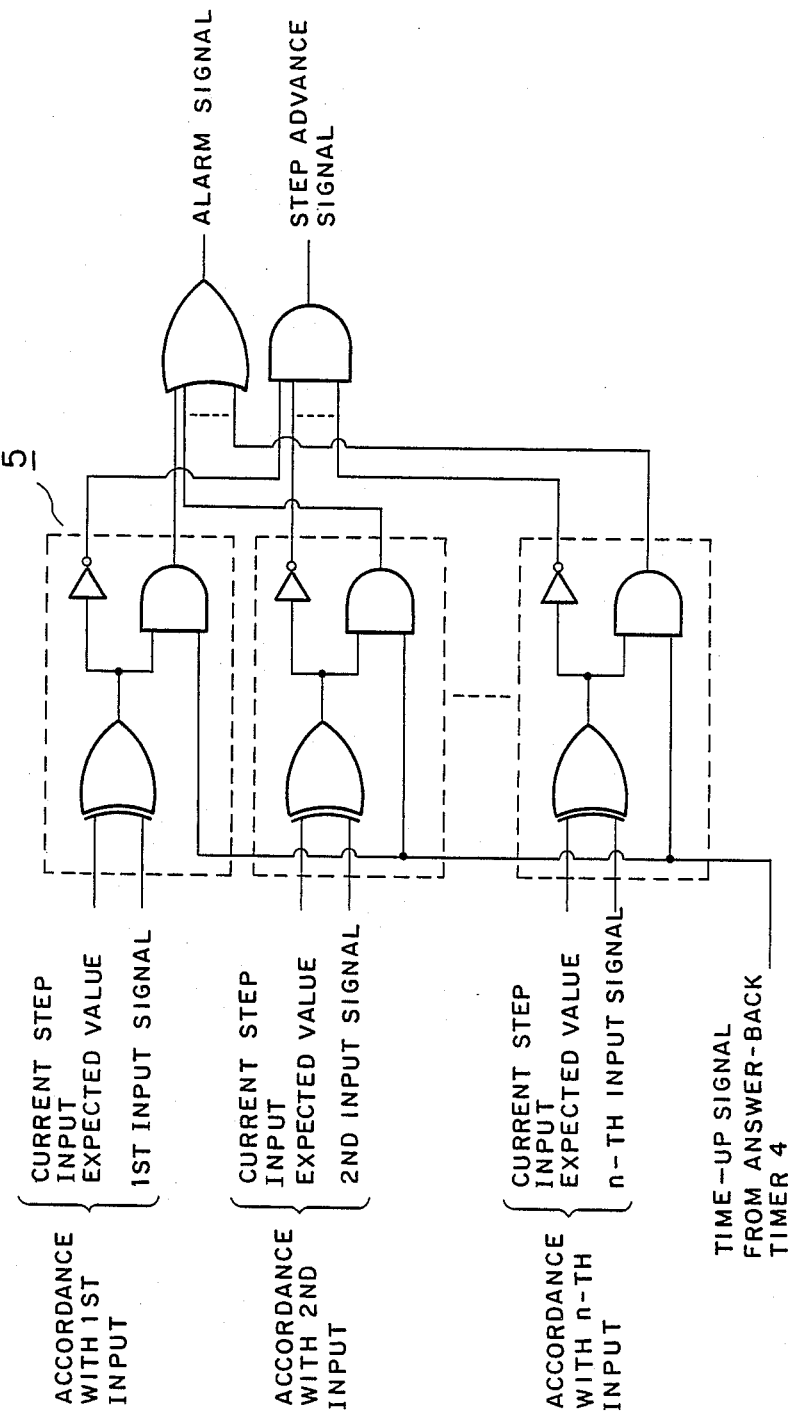
FIG. 2 is a detailed schematic diagram of the input check unit in the above conventional sequential controller.
Figure 3:
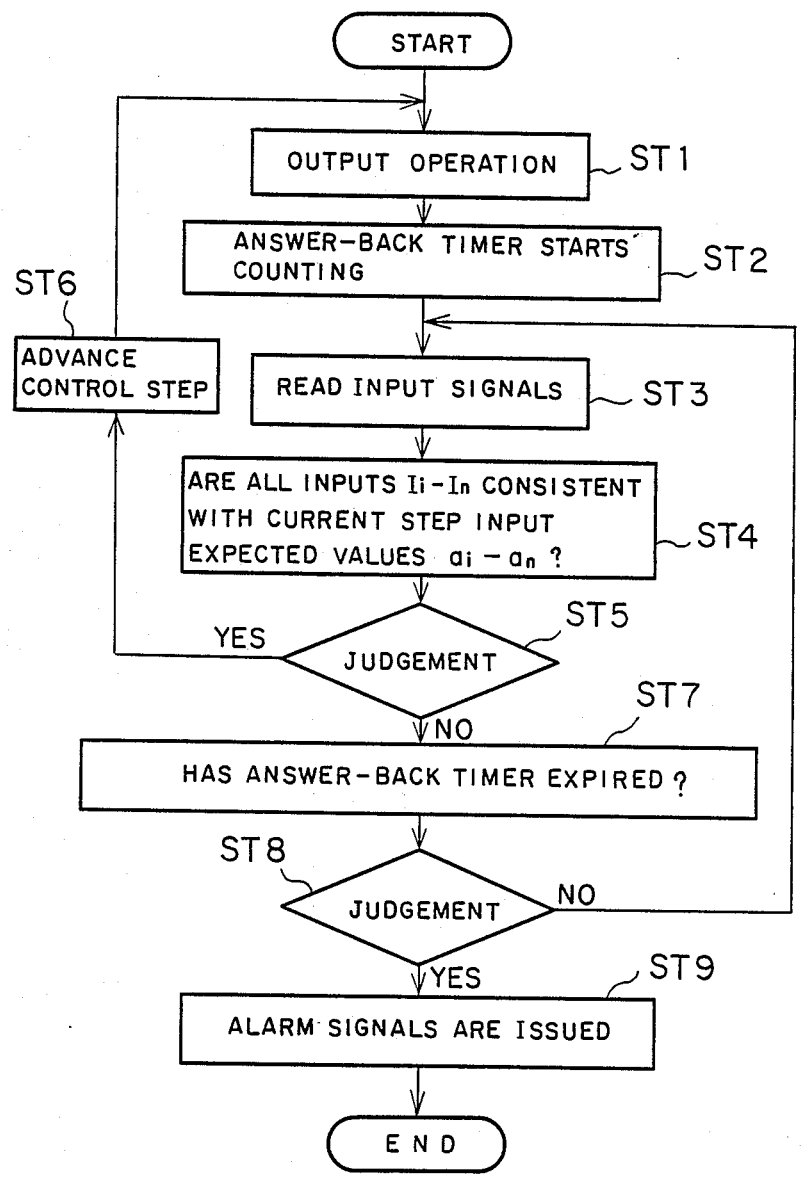
FIG. 3 is a flowchart showing the control algorithm of the above conventional sequential controller.
Figure 4:
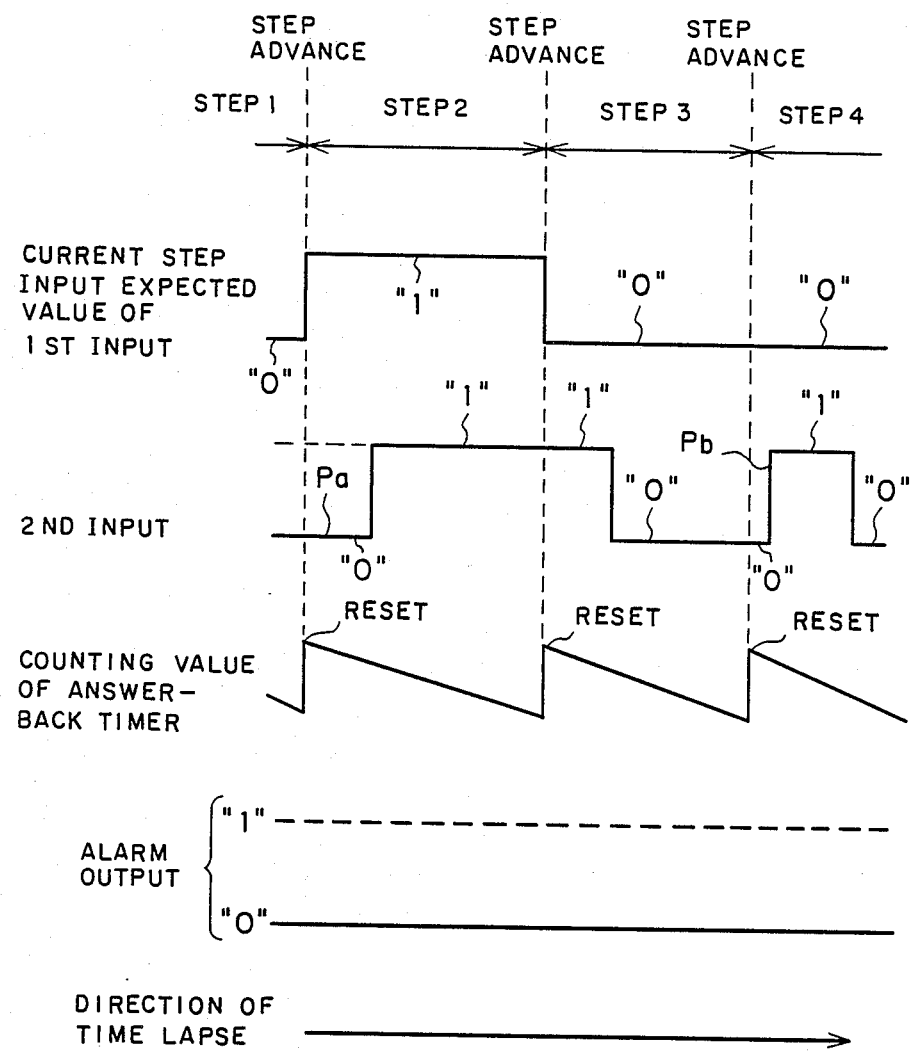
FIG. 4 is a timing chart explaining the input checking manner by the above conventional sequential controller.
Figure 5:
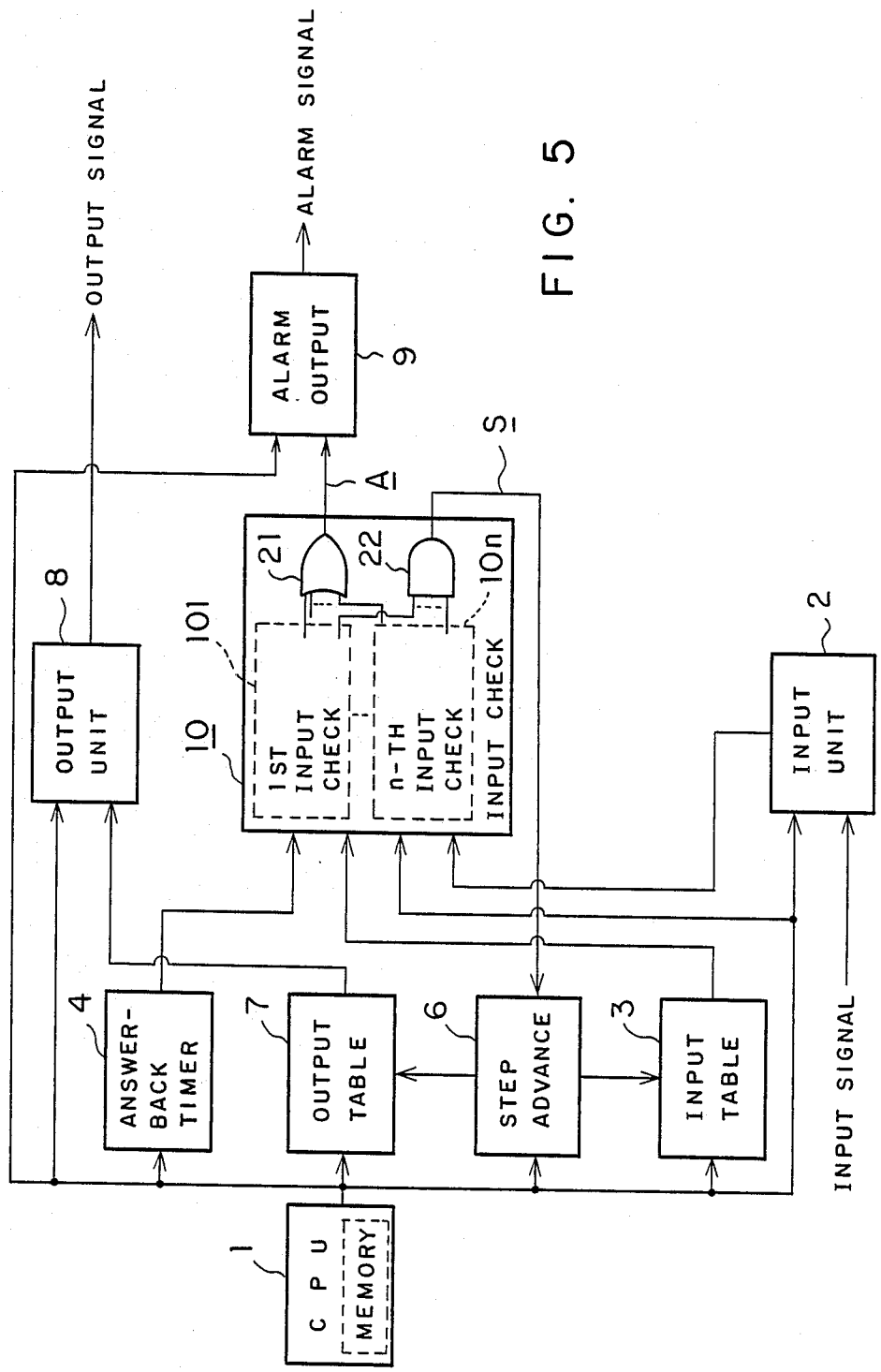
FIG. 5 is a block diagram of the sequential controller embodying the present invention.

A preferred embodiment of the present invention will now be described with reference to the accompanying drawings. FIG. 5 shows in block diagram the overall arrangement of the inventive sequential controller, in which functional blocks identical to those of the conventional sequential controller shown in FIG. 1 are referred to by the common symbols and explanation thereof will be omitted. The inventive system arrangement includes an input check unit 10 which receives the outputs of the input table 3, answer-back timer 4, step advance unit 6, and output table 7.

Figure 6A:
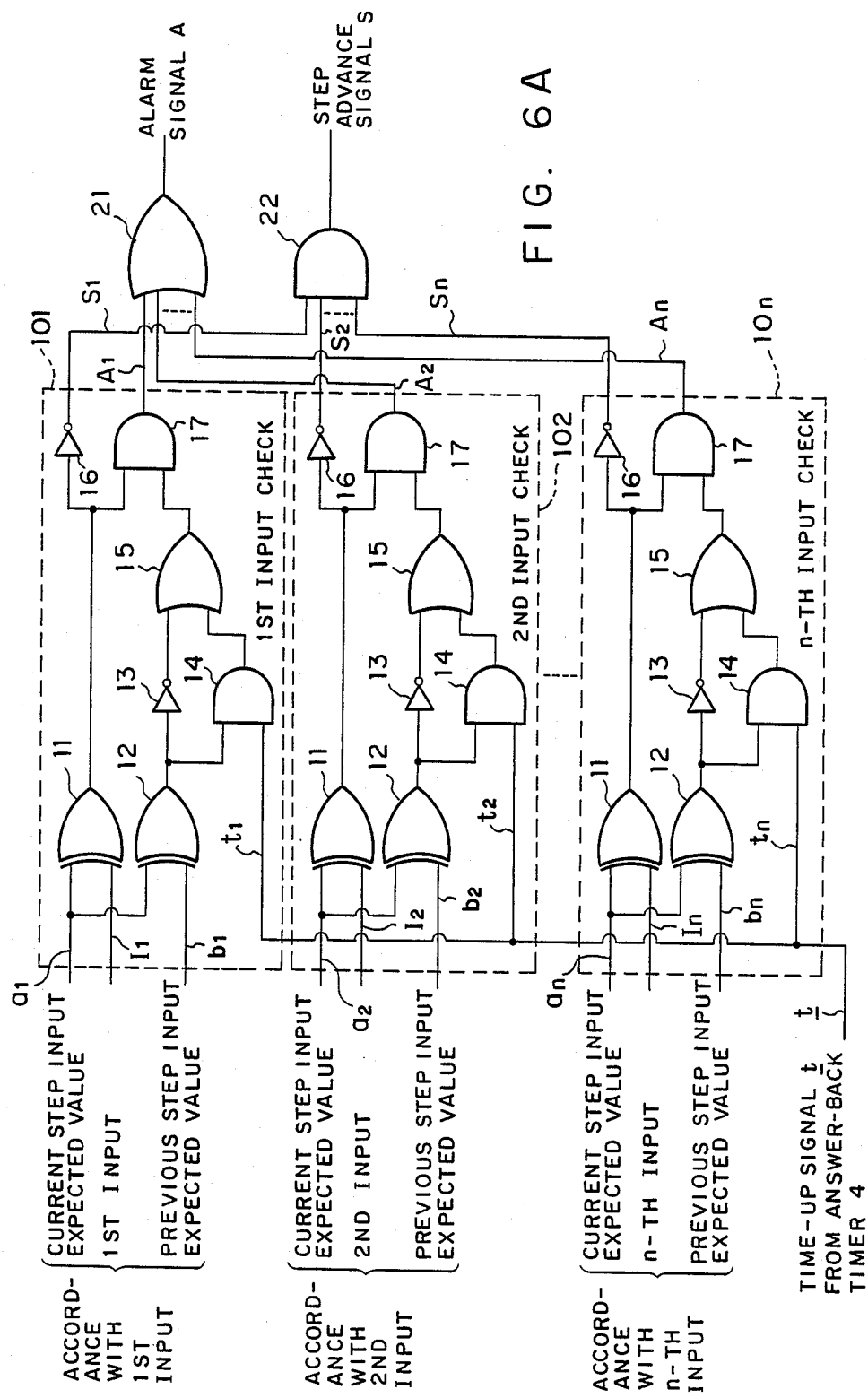
FIGS. 6A and 6B are schematic diagrams showing in detail the inventive input check unit in the above sequential controller shown in FIG. 5, where

The input check unit 10, as shown in detail in FIG. 6, consists of a first input check circuit 101 for checking the first input, a second input check circuit 102 for checking the second input, and so on up to an n-th input check circuit 10n for checking the n-th input, an OR gate 21 which receives alarm outputs A1, A2, ..., An provided by the input check circuits 101, 102, ..., 10n and produces an alarm signal A, and an AND gate 22 which receives step outputs S1, S2, ..., Sn of the input check circuits 101, 102, ..., 10n and produces a step advance signal S. Since all input check circuits 101, 102, ..., 10n have the same internal circuit arrangement, they will be explained using generalized symbols in the following.

Each input check circuit consists of an exclusive-OR gate 11 which receives a current step input expected value a and an input I, an exclusive-OR gate 12 which receives the current step input expected value a and a previous step input expected value b, an inverter 13 which produces a low-active signal in response to a high-active output signal of the exclusive-OR gate 12, an AND gate 14 which receives the output of the exclusive-OR gate 12 and the timer expiration signal from the aforementioned answer-back timer 4, an OR gate 15 which receives the outputs of the inverter 13 and AND gate 14, an inverter 16 which produces a low-active signal as the step output S1 in response to a high-active output signal from the exclusive-OR gate 11, and an AND gate 17 which takes a logical product for the outputs of the exclusive-OR gate 11 and OR gate 15 to produce the alarm output $A_1$.

As will be appreciated from the above description and illustration in FIG. 6 of the logical circuit arrangement, the input check unit 10 and its constituent input check circuits 101, 102, ..., 10n have their input-output relationship expressed as follows;

$$A = A_1 \vee A_2 \vee \ldots \vee A_n$$

where
$$A_1 = \{(a_1 \oplus b_1) \vee (a_1 \oplus b_1) \wedge t_1\} \wedge (a_1 \oplus I_1)$$
$$A_2 = \{(a_2 \oplus b_2) \vee (a_2 \oplus b_2) \wedge t_2\} \wedge (a_2 \oplus I_2)$$
$$\vdots$$
$$A_n = \{(a_n \oplus b_n) \vee (a_n \oplus b_n) \wedge t_n\} \wedge (a_n \oplus I_n)$$

$$S = S_1 \wedge S_2 \wedge \ldots \wedge S_n$$

where
$$S_1 = \overline{a_1 \oplus I_1}$$
$$S_2 = \overline{a_2 \oplus I_2}$$
$$\vdots$$
$$S_n = \overline{a_n \oplus I_n}$$

Next, the operation of the inventive sequential controller arranged as described above will be described.

Figure 6B:
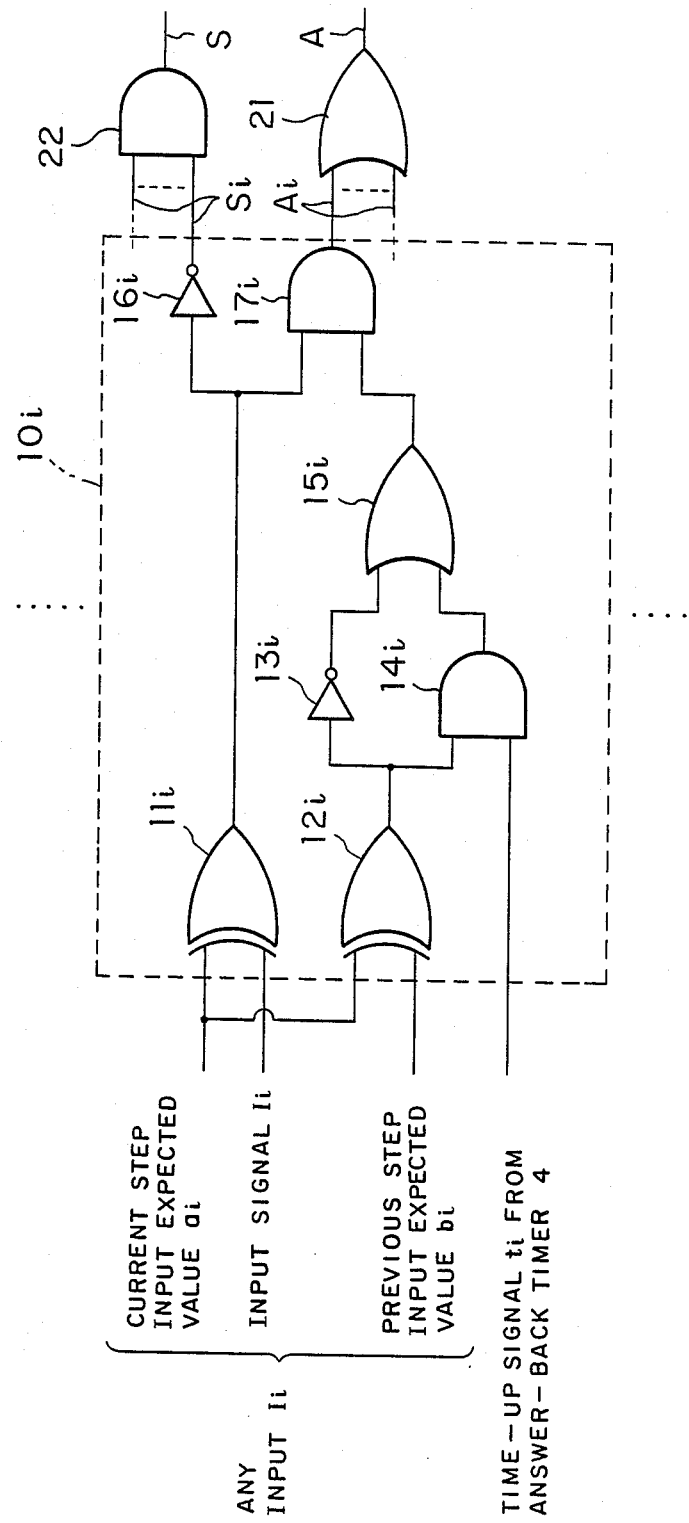
Figure 7A:
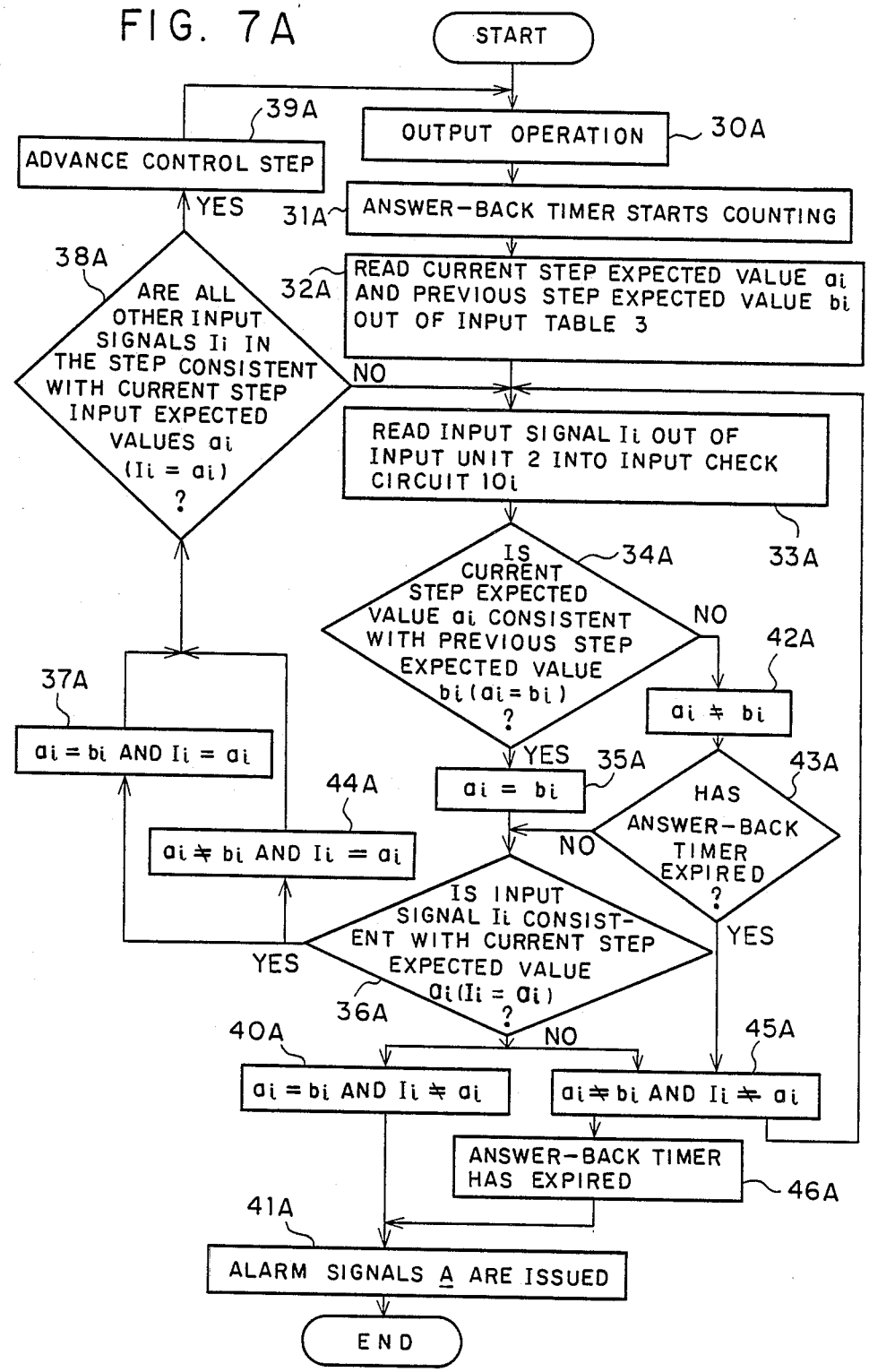
FIGS. 7A and 7B are flowcharts used to explain the operation of the inventive sequential controller shown in FIG. 5, where
Figures 8, 9:
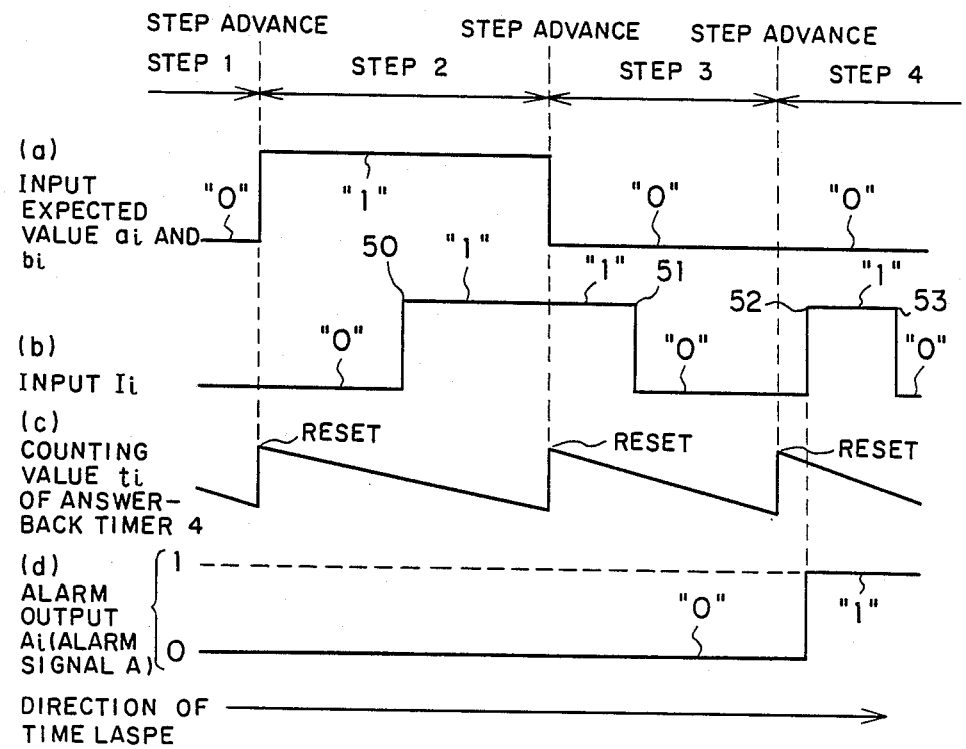
FIG. 8 is a control step table showing control events implemented by the inventive sequential controller.
FIG. 9 is a timing chart explaining the input checking manner by the inventive sequential controller.

First, in an example of any input signal $I_i$ taken among a number of inputs $I_1$ through $I_n$, how to check the input signal $I_i$ inputted to any input check circuit $10_i$ shown in FIG. 6B will be explained using FIG. 7A. If the control step is advanced, output signal is transmitted from the output table 7 through the output 8 to a terminal controlled device (not shown) (block 30A). The step table shown in FIG. 8 is made up of an output table in the upper section and an input table in the lower section. The output table 7 is prerecorded for the output pattern to be produced for the first output through the n-th output. Command control of the output signal is performed by the CPU 1 incorporating the memory, and the CPU 1 also starts the answer-back timer 4 which starts counting (block 31A). The CPU 1 reads out the input table 3 the current step input expected value $a_i$ of the output table 7 corresponding to the current step, and also reads out of the memory the previous step input expected value $b_i$ stored temporarily within the memory. These input expected values $a_i$ and $b_i$ are read in the input check circuit $10_i$ (block 32A). Subsequently, the input signal $I_i$ outputted through the input unit 2 out of the controlled device (not shown) is read in the input check circuit $10_i$ (block 33A); thus preparation of the input check operation of the input check circuit $10_i$ is finished.

Next, actual input operation will be described. First, the exclusive-OR gate $12_i$ judges whether the current step input expected value $a_i$ is consistent with the previous step input expected value $b_i$, i.e., the input expected values $a_i$ and $b_i$ through the two steps meet condition that $a_i=b_i$ (block 34A). If consistency exists, since output of the exclusive-OR gate $12_i$ always becomes "0", even if the time-up signal $t_i$ of output "1" is inputted to the AND gate $14_i$, output of the AND gate $14_i$ is "0" and output of the inverter $13_i$ is "1" and therefore output of the OR gate $15_i$ becomes "1" so that significant signal "1" is always inputted to one input terminal of the AND gate $17_i$. Consequently, when $a_i=b_i$ actually, irrespective of whether the answer-back timer 4 has expired or not, the operation process flows from block 35A to block 36A, thereby consistency or inconsistency between the input signal $I_i$ and the current step input expected value $a_i$ is checked. The check operation in the block 36A is performed by the exclusive-OR gate $11_i$ shown in FIG. 6B. The exclusive-OR gate $11_i$ produces output "0" when the inputs $a_i$ and $I_i$ supplied to two input terminals are consistent either signal "1" or signal "0". That is, the input expected values of the two steps are at state $a_i=b_i$ and the input signal and the expected value are at state $I_i=a_i$ (block 37A). In this case, output of the inverter $16_i$ becomes "1" on account of inversion of input "0", and the step advance output $S_i$ in the input check circuit $10_i$ transmits output "1" meaning transition to the AND gate 22. Consequently, if the input signal $I_i$ and the input expected value $a_i$ remain the same value until the set time of the answer-back timer has expired and all other input signals in the control step are consistent with the input expected value, the step advance signal S is outputted by the AND gate 22 (blocks 38A and 39A). If the control step is advanced to next step and operation of the blocks 31A through 39A is repeated. In the block 38A, since the input signal $I_i$ is read per sampling time through the input unit 2 based on the prescribed sampling period before the answer-back timer 4 has expired, process flows through the forward path of the negative decision in block 38A and then the above-mentioned input check operation in the blocks 33A through 38A is performed per prescribed sampling time within the answer-back time. If the input signal $I_i$ is inputted at value different from the input expected value $a_i$ at any sampling time within the answer-back time, the negative decision is effected in block 36A and process flows through block 40A and alarm signal A is immediately outputted (block 41A); thereby abnormal state in the input signal $I_i$ is detected. This operation will be described specifically in the logical circuit diagram of FIG. 6B. Output of the exclusive-OR gate $11_i$ is changed from "0" into "1"; thereby the inverter $16_i$ outputs "0" and the advance preparation of the control step is stopped at the time point. One input terminal of the AND gate $17_i$ is always supplied with "1" (based on $a_i=b_i$ as above described), and output of the AND gate $17_i$ becomes "1" on account of output "1" of the exclusive-OR circuit $11_i$. Consequently, one alarm output becomes "1" and therefore the OR gate 21 immediately outputs the alarm signal A.

Next, referring to FIG. 7A again, operation of the input check circuit $10_i$ will be described when the two values $a_i$ and $b_i$ of the current step and the previous step are inconsistent in block 34A. In this case, since the exclusive-OR gate $12_i$ shown in FIG. 6B has output "1", one input of the AND gate $14_i$ always becomes "1" and therefore the answer-back timer 4 acts effectively. However, until the timer has expired and output of the AND gate $14_i$ becomes "1", process flows through path of the negative decision in block 43A of FIG. 7A and check of the input signal in block 36A is performed. Even if the input signal $I_i$ is not consistent with the input expected value $a_i$ within the answer-back time, process is returned through block 45A to block 33A where the input signal $I_i$ is read based on the prescribed sampling period. The input check is performed through flow of block 34A→"NO"→block 42A→block 43A→"NO"→ the check operation in block 36A. If the input signal at any sampling time is consistent with the input expected value $a_i$, process passes through block 44A and operation in block 38A is performed. When the timer 4 has expired, if the input signal $I_i$ is consistent with the input expected value $a_i$ and all other inputs are consistent with the expected values, the control step is advanced to next step. In other words, if the exclusive-OR gate $11_i$ in FIG. 6B is changed from output "1" into output "0" and the inverter $16_i$ is changed from output "0" into "1", Further, if the step output $S_i$ becomes "1" in checking of all other inputs, the AND gate 22 transmits the step signal S and the control step is advanced simultaneously to the time-up of the answer-back timer 4. Next, if $a_i$ remains inconsistent with $b_i$ and $I_i$ remains inconsistent with $a_i$ in block 45A until the time-up of the answer-back timer 4, the control operation flows through block 46A to block 41A so that the alarm signal A is outputted. More specifically, in FIG. 6B, output of the AND gate $14_i$ becomes "1" on account of input "1" of the time-up signal $t_i$ and "1" is inputted to one input terminal of the OR gate $15_i$ thereby output of the OR gate $15_i$ becomes "1". One input terminal of the AND gate $17_i$ is previously supplied with "1" and also the other input terminal thereof is supplied with "1"; thereby the alarm output $A_i$ is transmitted and the OR gate 21 outputs the alarm output A.

Figure 7B:
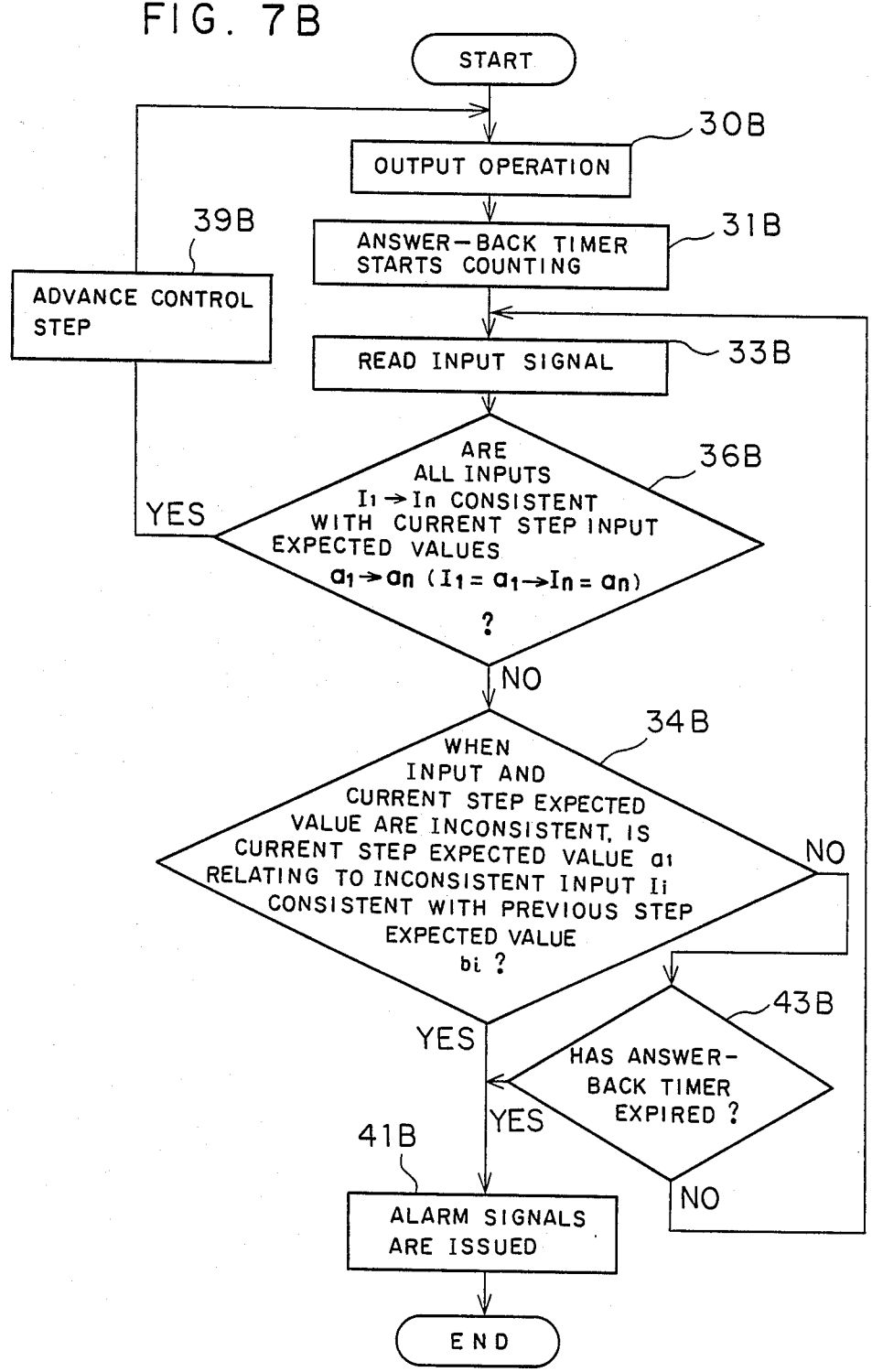

Operation of the embodiment has been described mainly in operation of any input check circuit $10_i$. Now, in order to summarize the operation explanation, the whole operation will be described using a whole flowchart of FIG. 7B and a signal characteristic diagram of FIG. 9. Each of a plurality of input check circuits $10_i$. Now individually repeats the above-mentioned operation, and the input check circuits $10_i$ as a whole check all input signals $I_1$ through $I_n$ together in the specific control step. That is, when the control step is advanced to a new step in FIG. 7B, the output operation is performed in block 30B in similar manner to FIG. 7A and the answer-back timer 4 starts counting (block 31B). Both previous and current step input expected values $a_i$ and $b_i$ are read in each input check circuit $10_i$; however, in FIG. 7B explaining operation of the input check unit as a whole, consistency between all input signals $I_1$ through $I_n$ and all input expected values $a_1$ through $a_n$ respectively is discriminated by the exclusive-OR gate $11_1$ in each circuit $10_i$. As supposed from the explanation in FIG. 7A, if the input expected values $a_i$ and $b_i$ in the two steps are inconsistent, since the input signal $I_i$ is scarcely consistent with the input expected values $a_i$ from the beginning of the control step, the negative decision in block 36B is frequently effected at the first sampling time. In this case, in the next decision block 34B, decision is effected as to whether the current step input expected value $a_i$ and the previous step input expected value $b_i$ are consistent respectively in the input table regarding the controlled device. Operation in the decision block 34B is specifically performed in the exclusive-OR gate 12 of each input check circuit $10_i$ as above described. If the positive decision is effected in the block 34B, that is, if the current step input expected value $a_i$ and the previous step input expected value $b_i$ are consistent in one of a plurality of input check circuits $10_1$ through $10_n$ and the input signal $I_i$ in the input check circuit $10_i$ with two consistent input expected values is inconsistent with the input expected value $a_i$ as the decision result, the alarm signal A is outputted in block 41B. This operation also can be explained specifically in that output "1" of the OR gate $15_i$ is inputted to one input terminal of the AND gate $17_i$ of the input check circuit $10_i$ and output "1" of the exclusive-OR gate $11_i$ is inputted to the other input terminal of the AND gate $17_i$ thereby the alarm output $A_i$ is immediately outputted. If the two input expected values $a_i$ and $b_i$ are inconsistent, the operation step is advanced to next decision block 43B and until the time-up of the answer-back timer 4 the input signal $I_i$ is read per prescribed sampling time based on the set sampling period (block 33B) so that the decision operation of block 36B block 34B block 43B is repeated. If all input signals are consistent with input expected values respectively until the time-up of the answer-back timer 4, operation step is advanced to block 39B where process is advanced to next control step. If the control step is advanced, quite the same input check operation as the above-mentioned operation is repeated.

The above-mentioned input check operation will be explained referring to a time chart of FIG. 9 illustrating variation of the input expected signal $a_i$, the input signal $I_i$ and the time-up signal (counting value of the answer-back timer 4) $t_i$. In FIG. 9, for convenience, the input signal $I_i$ from one controlled device and the input expected values $a_i$ and $b_i$ (shown in one wave form because $b_i$ is the previous input value) and the time-up signal $t_i$ are only shown and the alarm output $A_i$ is outputted by input check based on these signals. That is, FIG. 9 can be easily understood by supposing operation of each input check circuit $10_i$ of FIG. 7A. First, from variation of the input expected value $a_i$, i.e., $b_i$ in FIG. 9, it is understood that between the first step and the second step and between the second step and the third step the two previous and current step input expected values $a_i$ and $b_i$ are inconsistent and that between the third step and the fourth step the values $a_i$ and $b_i$ are consistent. Next, variation of the input signal $I_i$ is compared based on variation of the input expected values $a_i$ and $b_i$. At step 1, since the chart begins from the midway, it is assumed that no abnormal state occurs in the input signal $I_i$, and at step 2 since the input expected values $a_i$ and $b_i$ are inconsistent the input check is performed until the time-up of the answer-back timer 4 (Flow from blocks 34A, 42A and 45A to block 33A in FIG. 7A is repeated.). Since the input signal $I_i$ in FIG. 9(b) becomes signal "1" being consistent with the input expected value $a_i$ at the read time point 50, the alarm output $A_i$ is not produced regarding the input signal $I_i$, and if no abnormal state occurs regarding other input until the time-up state step is advanced. At step 3, since the same operation step as the input check operation of step 2 is followed and then the input signal $I_i$ and the input expected value $a_i$ are consistent in required signal value "0" at the read time point 51, the alarm is not outputted in similar manner to step 2 but step is advanced simultaneously to the time-up of the answer-back timer 4. At step 4, since the input expected value $a_i$ is "0" and the input expected value $b_i$ at step 3 as the previous step is also "0", it follows that $a_i = b_i$ and the input check operation is performed as in blocks 34A, 35A and 36A of FIG. 7A. Since the actual input signal $I_i$ at the step advance becomes signal value "0" being consistent with signal value "0" of the input expected value $a_i$, flow of blocks 37A→38A→33A→34A is repeated and therefore no problem exists at the step advance. When the actual input signal $I_i$ and the input expected values $a_i$ become inconsistent, that is, "$I_i \neq a_i$", the alarm output $A_i$ and the alarm signal A are immediately outputted without relation to a counted value of the answer-back timer 4 through the blocks 34A→35A→36A→40A shown in FIG. 7A. Consequently, if signal with signal value "1" being different from the input expected value $a_i$ is inputted at the signal read time point 52, the alarm output $A_i$ is immediately outputted as in FIG. 9(d). The input signal $I_i$ becomes consistent with the input expected value $a_i$ in signal value "0" again at the read time point 53. However, when the input expected values $a_i$ and $b_i$ are consistent, since abnormal state of the input signal $I_i$ from the step advance time point until next step advance is all detected, the alarm $A_i$ once outputted is not released and the step is not advanced.

In the foregoing embodiment a single answer-back timer is provided for the sequential controller. Even if the sequential controller is composed of a plurality (up to the number of inputs) of answer-back timers which may be provided for several inputs, so that the input check mode is changed in response to the detection of consistency between the current and previous step input expected values, with the same effectiveness as the above embodiment being attained.

According to the present invention, as described above, the input check unit is provided with a check circuit for detecting whether or not input expected values of the current step and previous step are consistent so that the usual answer-back checking or continuous checking for input values are selected, whereby the most suitable input checking can be accomplished for the operation of each controlled device and the occurrence of malfunctioning of a controlled device or abnormality of an external device can surely be alerted at high reliability.

What is claimed is:

1. A sequential controller comprising:
   a central processing unit which introduces a plurality of input signals into an input unit and insures a plurality of output signals from an output unit for controlling controlled devices based on a prescribed control algorithm, said control processing unit incorporating a memory;
   an output table which stores an output pattern of said output signals;
   an input table which stores an input pattern of expected input signals;
   a step advance unit which provides a current control step signal to said output table and input table;
   an answer-back timer which counts the response time of each control step and provides an expiration signal upon expiration of the time set on said answer-back timer;
   an input check unit which receives said expiration signal and compares said input signals with a pattern of input expected values for said input signals at the current control step; and
   an alarm output unit which is operated by an alarm signal produced by said input check unit in response to inconsistency between said input signals and said pattern of expected values as a result of comparison implemented after reception of said expiration signal between said input signals and the pattern of input expected values for said input signals at the current control step;

wherein said input check unit includes an input collating check unit which compares a pattern of input expected values for said input signals at the current control step with a pattern of input expected values of said input signals at the preceding control step and issues an alarm signal to said alarm output unit, when said expiration signal has been received, and when said input signals are not consistent with the pattern of input expected values for said input signals at the current control step and, at the same time, the patterns of input expected values of said input signals at the current and preceding control steps are not consistent.

2. A sequential controller according to claim 1, wherein said input check unit always checks as to whether or not the current input expected values and subsequent input expected values are equal even after the step advancement by said step advance unit in case said input signals have equal input expected values for two consecutive control steps, or implements the answer-back checking for testing abnormality of the response time in consideration of the operation time of a controlled device in response to said expiration signal from said answer-back timer in case the input expected values at the current and preceding control steps are different.

3. A sequential controller according to claim 1, wherein said input check unit includes a plurality of input collating check units which individually check by comparison each input signal used for controlling each of said controlled devices and produced for each controlled device or each group of controlled devices.

4. A sequential controller according to claim 3, wherein each of said input collating check units includes a first collating means for comparing said input signal with the input expected value for said input signal at the current control step, and a second collating means for comparing the input expected value at the current control step with the input expected value at the preceding control step.

5. A sequential controller according to claim 4, wherein said first and second collating means included in said input collating check unit comprise exclusive logical sum circuits.

6. A sequential controller according to claim 1, wherein said input check unit includes a first through n-th (n is a positive integer) input collating check units for implementing individual collating check for a first through n-th (n is a positive integer) inputs produced by a plurality of control objects such as various types of controlled devices, each of said input collating check units comprising a first exclusive logical sum circuit for collating a corresponding input signal with the input expected value of said signal at the current control step, a second exclusive logical sum circuit for collating the input expected value at the current control step with the input expected value at the preceding control step, a logical negation circuit which receives the output of said first exclusive logical sum circuit and produces a step signal which is an inverted version of the circuit input, a logical sum circuit which takes logical sum between a negated output of said second exclusive logical sum circuit and a logical product output for the output of said second exclusive logical sum circuit and an expiration signal from said answer-back timer, and a logical product circuit which takes logical product between the output of said logical sum circuit and the output of said first exclusive logical sum circuit to produce an alarm output for said input signal.

7. A sequential controller according to claim 6, wherein said input check unit includes a logical product circuit which takes logical product for a first through n-th step signals produced by said logical negation circuit in each of said first through n-th input collating check units and produces a step advancing signal as an output of said input check unit, and a logical sum circuit which takes logical sum for said first through n-th alarm outputs produced by said logical product circuit in each of said first through n-th input collating check units and sends the alarm signal as an output of said input check unit to the alarm output unit.

8. A sequential controller according to claim 7, wherein said first through n-th input collating units in said input check unit operates basing on the algorithm given by the following logical expressions;

$$\begin{cases} \begin{cases} A = A_1 \vee \ldots \vee A_n \\ A_1 = \{(a_1 \oplus b_1) \vee \overline{(a_1 \oplus b_1)} \wedge t_1\} \wedge (a_1 \oplus I_1) \\ \vdots \\ A_n = \{(a_n \oplus b_n) \vee \overline{(a_n \oplus b_n)} \wedge t_n\} \wedge (a_n \oplus I_n) \end{cases} \\ \begin{cases} S = S_1 \wedge \ldots \wedge S_n \\ S_1 = \overline{a_1 \oplus I_1} \\ \vdots \\ S_n = \overline{a_n \oplus I_n} \end{cases} \end{cases}$$

where a symbol A is an alarm signal as an output of an OR circuit in said input check unit;

symbols $A_1 \ldots A_n$ are alarm outputs as outputs of AND circuits in said input collating units;

symbols $I_1 \ldots I_n$ are a first through n-th input signals;

symbols $a_1 \ldots a_n$ are current step input expected values corresponding to said first through n-th input signals $I_1 \ldots I_n$;

symbols $b_1 \ldots b_n$ are previous step input expected values as against a first through n-th current steps;

symbol S is a step advance signal as an output of AND circuit in input check unit; and, symbols $S_1 \ldots S_n$ are step signals as outputs of said input collating units.

9. A sequential controller according to claim 1, wherein said answer-back timer is designed to set answer-back time for each control step integrally for all inputs which undergo collating check by said input check unit.

10. A sequential controller according to claim 1, wherein said answer-back timer is designed to set answer-back time for each control step individually for each input collating check unit in said input check unit.

* * * * *

UNITED STATES PATENT AND TRADEMARK OFFICE
CERTIFICATE OF CORRECTION

PATENT NO. : 4,827,396
DATED : May 2, 1989
INVENTOR(S) : YASUNORI TANIGUCHI ET AL.

It is certified that error appears in the above-identified patent and that said Letters Patent is hereby corrected as shown below:

Col. 4, line 20, "$\{(a_1 \oplus b_1)$" should be --$\{\overline{(a_1 \oplus b_1)}$--;

Col. 4, line 21, "$\{(a_2 \oplus b_2)$" should be --$\{\overline{(a_2 \oplus b_2)}$--;

Col. 4, lines 23-25, delete "." (second column);

Col. 4, line 26, "$\{(a_n \oplus b_n)$" should be --$\{\overline{(a_n \oplus b_n)}$--;

Col. 4, lines 32-35, add --.-- under "$\oplus$" of line 31.

Col. 6, line 43, after "$10_i$" delete ".";

Col. 6, line 44, delete "Now".

Col. 7, line 21, after "36B" insert -- → --; same line, after "34B" insert -- → --;

Col. 7, line 44, "a" should be --$a_1$--.

Col. 8, line 8, "values" should be --value--;

Col. 8, line 47, "insures" should be --issues--.

UNITED STATES PATENT AND TRADEMARK OFFICE
CERTIFICATE OF CORRECTION

PATENT NO. : 4,827,396
DATED : May 2, 1989
INVENTOR(S) : YASUNORI TANIGUCHI ET AL.

It is certified that error appears in the above-identified patent and that said Letters Patent is hereby corrected as shown below:

Col. 10, line 22, "basing" should be --based--;

Col. 10, lines 29-31, delete "." (second column);

Col. 10, lines 29-31, add --.-- under "$a_1$" (second occurrence)

Col. 10, lines 37-40, delete "." (second occurrence);

Col. 10, lines 37-40, add --.-- under "$\oplus$" of line 36.

Signed and Sealed this

Sixteenth Day of October, 1990

Attest:

HARRY F. MANBECK, JR.

*Attesting Officer*      *Commissioner of Patents and Trademarks*